Dec. 7, 1937.  R. H. MAYO  2,101,743
AIRCRAFT
Filed Feb. 16, 1937  3 Sheets-Sheet 1
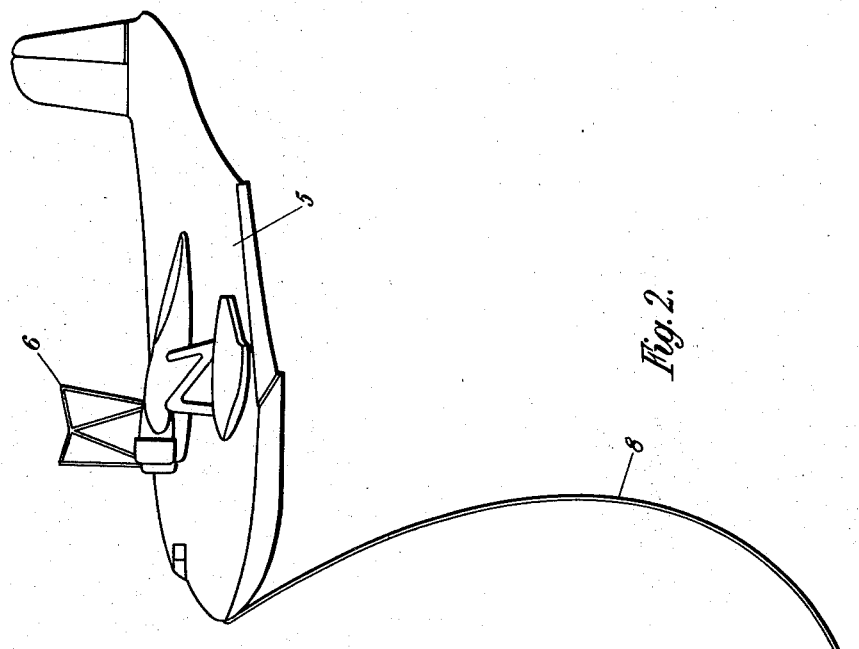
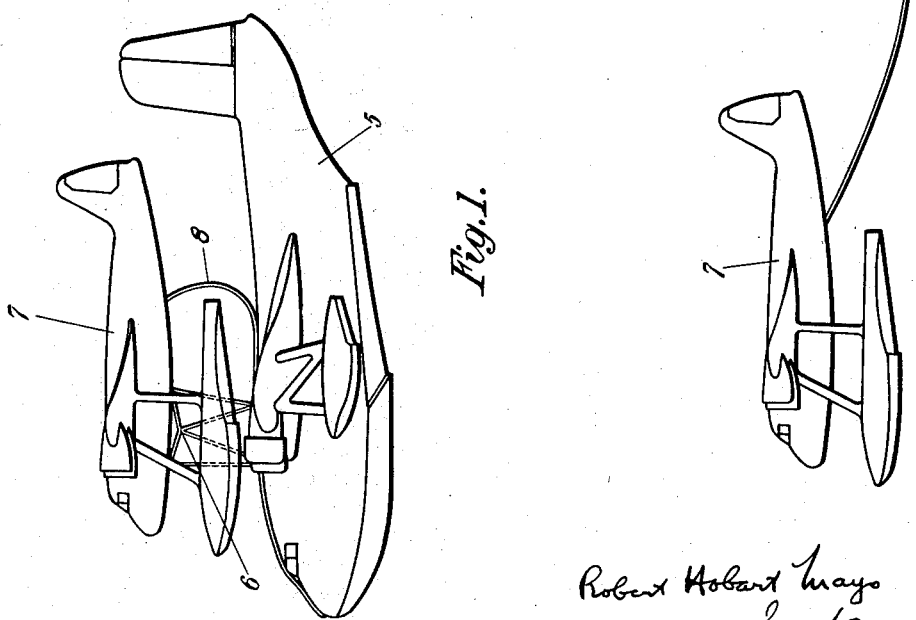

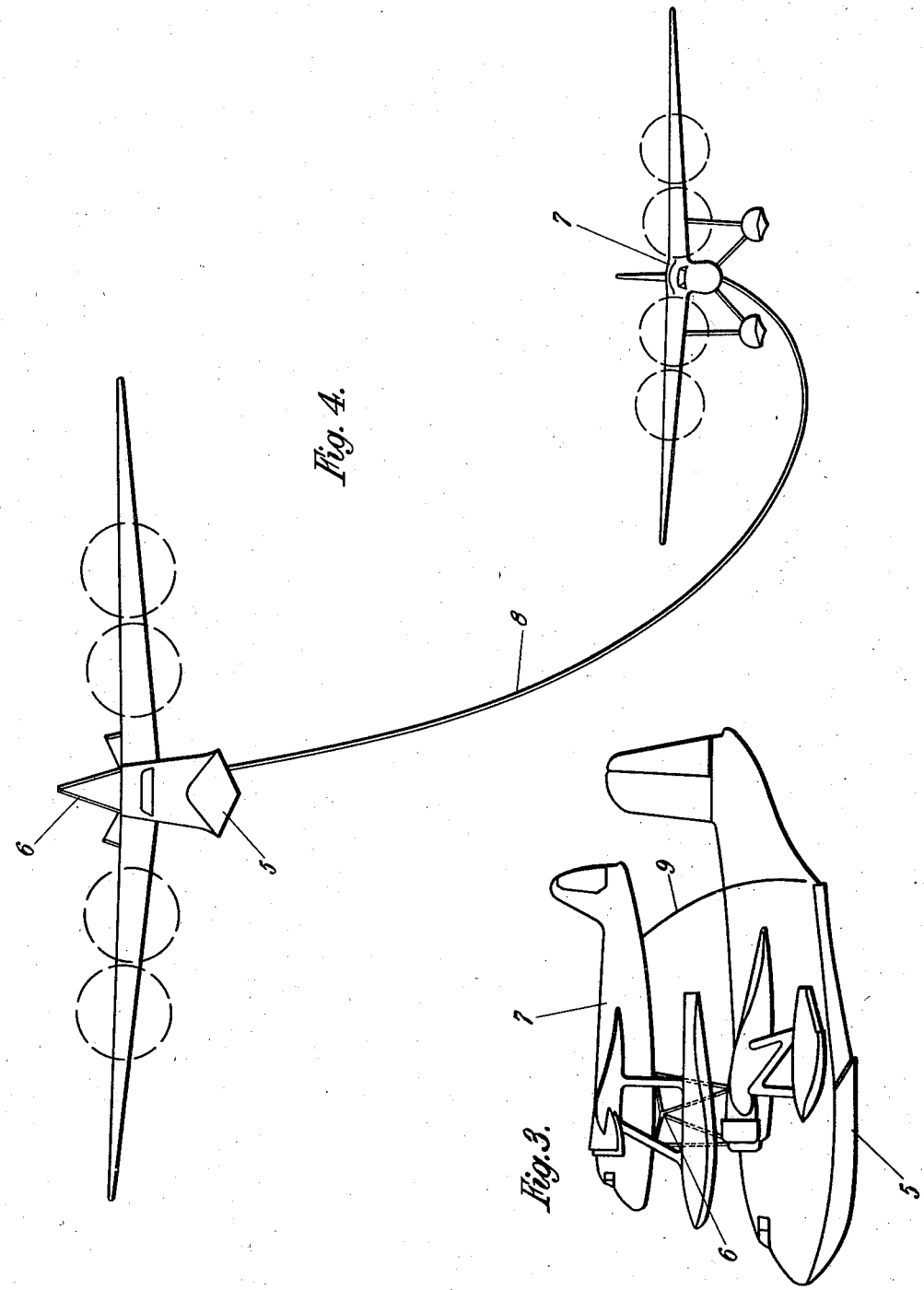

Robert Hobart Mayo
Inventor
By Wm Lamb Atty.

Patented Dec. 7, 1937

2,101,743

UNITED STATES PATENT OFFICE 2,101,743

AIRCRAFT

Robert Hobart Mayo, London, England

Application February 16, 1937, Serial No. 126,047
In Great Britain March 24, 1936

3 Claims. (Cl. 244—2)

In the specifications of my United States Patents Nos. 1,925,768, 1,974,684 and 2,009,296, I have described composite aircraft comprising two component aircraft each capable of separate flight, which are initially locked together so that they can take off and fly together as a single unit, but can be detached during flight of the composite aircraft so that each component can proceed independently as a separate unit. In the specifications mentioned I have described means for ensuring safe separation of the two components, such that even if the total load to be carried is concentrated in the upper component it will rise vertically from the lower component when the locking means are released, without risk of subsequent collision or fouling.

These previous inventions thus provide means by which a very heavily loaded aircraft can be safely launched in flight at any desired altitude without incurring the risks and difficulties associated with the take-off of a very heavily loaded aircraft of normal type. A particular application of these inventions is the launching of an aircraft carrying a very heavy load of fuel such as is required for long range work.

The present invention provides a composite aircraft comprising two component aircraft mounted one on top of the other, with releasable locking means enabling the two components to be detached during flight of the composite aircraft, and means by which fuel and, if desired, oil can be transferred from one component to the other after the release of the locking means and detachment of the components, but prior to their final separation. The invention provides a flexible connecting link which remains between the two component aircraft after their detachment and enables the desired transference of fuel from one to the other to be effected. This connecting link may be constituted either by a flexible pipe line or pipe lines which couple together the tank systems of the two component aircraft before detachment, or a cable or the like which enables such a pipe line to be drawn over from one component aircraft to the other after detachment to establish a fuel-transferring connection between them. Means are provided to effect detachment of the pipe line or pipe lines from one or other of the components when the desired transference of fuel has been effected, and preferably also means by which the pipe line or pipe lines can then be retracted into the component to which it or they still remain attached. Suitable valves are provided to enable the flow of fuel from one component to the other to be regulated and terminated when desired.

In practice the most useful application of the invention will be in transferring fuel from the lower component of the composite aircraft to the upper component. In order to effect this transference after the upper component has risen clear of the lower component suitable pumps may be provided in either component to lift the fuel from the lower component to the upper component, while the latter remains flying at a suitable height above the lower component and in a suitable position in relation to that of the lower component. Alternatively, after detachment of the upper component from the lower component, the former can take up a suitable position below the lower component, so that the transference of fuel can be effected by means of gravity. In this case the flexible connecting link must of course be such that the change in relative positions of the upper and lower components can be effected without straining it and without involving the risk of fouling between the connecting link and any part of either component. It will be understood that in either case the flexible cable and/or pipe line will have sufficient length to ensure that the two components can take up and maintain their respective stations without involving any risk of straining the cable and/or pipe line.

Two arrangements of composite aircraft according to the invention are illustrated, by way of example, in the accompanying drawings, in which:—

Figure 1 is a side elevation of the first arrangement;

Figure 2 is a side elevation showing the components of the composite aircraft after detachment and in position to commence fuel transfer;

Figure 3 is a side elevation of the second arrangement;

Figure 4 is a front elevation showing the components of this second arrangement after detachment and in position to commence fuel transfer.

Like references indicate like parts throughout the drawings.

Figure 5:
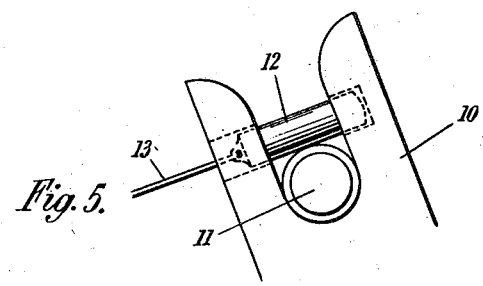

In each case the lower component 5 of the composite aircraft carries a superstructure 6 which supports the upper component 7, the two components being normally connected together by a locking means, such for example as that illustrated by way of example in Figure 5. This consists of a socket 10 fixed to the superstructure 6 on the lower component and engaging a pin 11 fixed to the upper component. Normally the pin is held in the socket by a bolt 12, thus locking the two components together. The bolt 12 can however be withdrawn by a cable 13, when it is desired that detachment should take place.

The two components are also interconnected by a flexible link, which in the arrangement shown in Figure 1 is constituted by a pipe line 8, and in the arrangement shown in Figure 3 by a cable 9 by means of which a pipe line 8 may be drawn across from one component to the other after detachment to effect a fuel-transferring connection between them.

In both instances the upper component initially carries a minimum load of fuel in order to facilitate detachment. After release of the locking means the upper component maneuvers into position below the lower component, as shown in Figures 2 and 4, the pipe line 8 being paid out from one component or the other to permit of this maneuver. Fuel is then transferred by gravity flow through the pipe line from the lower component 5 to the upper component 7, and when the latter has received sufficient fuel to enable it to perform a long distance flight as a separate unit, the end of the pipe line is cast off from one component, and the pipe line retracted into the other.

Figure 6:
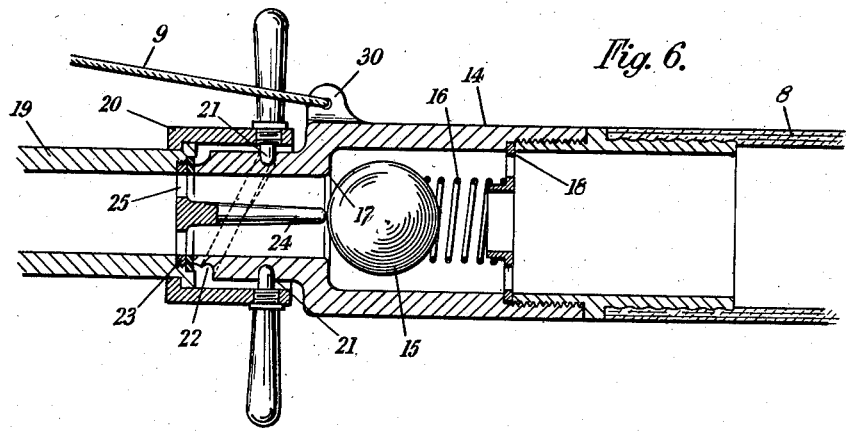
Figures 5, 6 and 7 are respectively diagrammatic views of a suitable form of locking means, of a nozzle fitting at the end of the pipe line, and of a means for retracting the pipe line after the refuelling operation is completed.

In Figure 6 is shown a suitable form of nozzle fitting 14 for use on the end of the pipe line 8. This comprises a ball valve 15 normally held by a spring 16 against a seating 17. The abutment for the spring is constituted by an apertured boss 18 fixed in the nozzle. 19 is a petrol pipe on the fuel-receiving component which is arranged to receive the nozzle and is provided at its end with a union nut 20 having inwardly extending projections 21 for engaging a quick thread 22 on the outer surface of the nozzle. By turning the nut 20 the nozzle can be drawn into liquid-tight engagement with a rubber washer 23 mounted in the mouth of the pipe 19. Simultaneously the ball valve 15 is opened owing to the ball being forced against a striker 24 fixed to a spider 25 mounted in the mouth of the pipe 19. At the conclusion of the refueling operation the nut 20 is slackened, thereby allowing the valve 15 to close and the nozzle 14 to separate from the receiving pipe 19.

Figure 7:
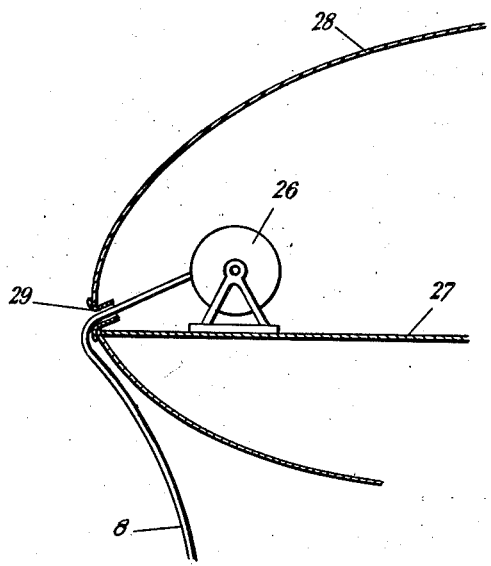

The upper end of the pipe line 8 is wound round a drum 26 (Figure 7) carried on a deck 27 within the hull 28 of the fuel-supplying component, the pipe line passing out through a hawse hole 29 in said hull. After the nozzle 14 has been uncoupled from the receiving pipe 19, as described above, the pipe line 8 is retracted into the fuel-supplying component by rotating the drum 26.

The nozzle 14 carries a bracket 30 for attachment of the cable 9 by means of which the pipe can be drawn over from one component to the other after detachment, in the case where the pipe line connection is not already established prior to detachment.

By means of this invention it is possible to realize the advantages of a composite aircraft in which the upper component is intended to carry a heavy load of fuel without incurring any disadvantages which may be associated with the placing of a heavy load of fuel in the upper component during the flight of the composite aircraft as such. Thus, if during flight of the composite aircraft the upper component is carrying only a light load, the problem of providing a separating force sufficient to ensure safe separation of the components will be simplified, and the special measures for achieving this described in specifications Nos. 1,925,768 and 1,974,684 may not be necessary. Again, structure weight may be saved and stability and control of the composite aircraft improved if a large proportion of the total load of fuel can be carried in the lower component during the take-off and flight of the composite aircraft.

On the other hand this invention enables the advantages of refuelling in the air to be achieved without incurring the difficulties which are associated with the problem of making contact between the two aircrafts, which arises in all but the most favourable weather conditions. It has hitherto been impracticable to effect refuelling in the air in conditions of cloud, fog, bad visibility or serious bumpiness of the air, owing to the difficulty and danger in establishing a connecting link between the two aircraft. By means of this invention, therefore, the refuelling operation can be effected in much more unfavourable weather conditions than those required where the two aircraft take off separately and subsequently have to establish a connecting link.

What I claim as my invention and desire to secure by Letters Patent is:—

1. A composite aircraft comprising in combination a lower component carrying a relatively heavy load of fuel, an upper component mounted on top of the lower component and carrying a relatively light load of fuel, locking means which secure the two components together but are releasable to enable the upper component to separate from the lower component during flight, and a fuel-transferring connection between the two components which continues to interconnect them after release of the locking means, and enables fuel to be transferred from the lower to the upper component after the two components have separated.

2. A composite aircraft according to claim 1, in which the fuel-transferring connection constitutes a pipe line interconnecting the fuel tanks of the two components.

3. A composite aircraft according to claim 1, in which the fuel-transferring connection includes a cable by means of which a pipe line connection can be established between the fuel tanks of the two components after separation.

ROBERT HOBART MAYO.